United States Patent [19]
Jiang et al.

[11] Patent Number: 5,946,121
[45] Date of Patent: Aug. 31, 1999

[54] IRDA DATA LINK WITH VCSEL LIGHT SOURCE

[75] Inventors: Wenbin Jiang, Phoenix; Michael S. Lebby, Apache Junction, both of Ariz.

[73] Assignee: Motorola, Inc., Schaumburg, Ill.

[21] Appl. No.: 08/674,377

[22] Filed: Jul. 2, 1996

[51] Int. Cl.⁶ ............................................. H04B 10/00
[52] U.S. Cl. .................... 359/172; 359/173; 359/180; 359/29; 359/455; 369/112; 385/24; 385/33; 385/43
[58] Field of Search .................... 359/172, 173, 359/152, 180, 124, 29, 215, 455; 385/88, 24, 33, 43; 369/112

[56] References Cited

U.S. PATENT DOCUMENTS

| | | | |
|---|---|---|---|
| 5,073,041 | 12/1991 | Rastani | 385/33 |
| 5,138,489 | 8/1992 | Paek | 359/29 |
| 5,483,511 | 1/1996 | Jewell et al. | 369/112 |
| 5,526,182 | 6/1996 | Jewell et al. | 359/455 |
| 5,557,693 | 9/1996 | Stevens et al. | 359/173 |
| 5,652,813 | 7/1997 | Wilson | 385/24 |
| 5,668,826 | 9/1997 | Bezinge et al. | 359/180 |
| 5,761,364 | 6/1998 | Knapp et al. | 385/43 |

*Primary Examiner*—Jeffrey A. Hofsass
*Assistant Examiner*—John Tweel, Jr.
*Attorney, Agent, or Firm*—Eugene A. Parsons; William E. Koch

[57] ABSTRACT

A light source for use in an infra-red data association data link device including a vertical cavity surface emitting laser for emitting a beam of light along a path, and a diverger positioned in the path for diverging the emitted beam of light.

18 Claims, 1 Drawing Sheet

IRDA DATA LINK WITH VCSEL LIGHT SOURCE

FIELD OF THE INVENTION

This invention relates to photonic devices employing a light source. More particularly, the present invention pertains to light sources for IrDA data links.

BACKGROUND OF THE INVENTION

In many electronic devices great amounts of data need to be transmitted, such as between a computer and peripheral devices. A very efficient means of transmitting data is by using photonic devices. Currently, infra-red data association (IrDA) data link devices are used, generally in the form of transceivers. The transceivers employ light emitting diodes (LED) as the light generating source. These devices are highly effective, as an LED will generate sufficient light over a sufficiently large area to be easily received by a transmission medium such as an optical fiber.

While using an LED as a light source is effective, an LED is not energy efficient, requiring substantial current for operation. Large power consumption is highly undesirable for portable applications which are becoming increasingly more prevalent. Typically, an LED requires approximately 250 mA pulsed at 30 degree viewing angle. Furthermore, as data becomes more complex and therefore grows in size correspondingly, higher transmissions speeds are required. Currently LED devices transmit at approximately 115.2 kbits/sec.

It would be highly advantageous, therefore, to remedy the foregoing and other deficiencies inherent in the prior art.

Accordingly, it is an object of the present invention to provide a new and improved light source for a data link device.

Another object of the invention is to provide a new light source for a data link device, capable of higher transmission speeds.

And another object of the invention is to provide a new data link light source having low power consumption making it ideal for portable use.

SUMMARY OF THE INVENTION

Briefly, to achieve the desired objects of the instant invention in accordance with a preferred embodiment thereof, provided is a light source for use in an infra-red data association data link device. The light source includes a vertical cavity surface emitting laser for emitting a beam of light along a path, and a diverger positioned in the path for diverging the emitted beam of light.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DESCRIPTION OF THE PREFERRED EMBODIMENTS

Figure 1:
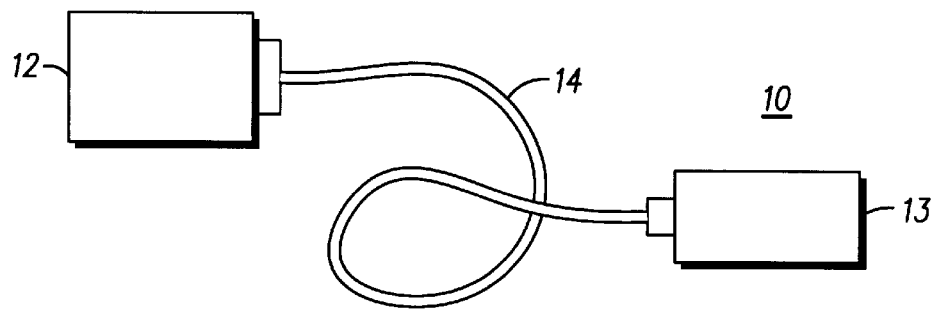
FIG. 1 is a simplified diagram of a data link.

Turning now to the drawings in which like reference characters indicate corresponding elements throughout the several views, attention is first directed to FIG. 1 which illustrates a simplified diagram of a data link generally designated 10. Data link 10 includes a light transmitting device 12 and a light receiving device 13 coupled by a transmission medium such as an optical fiber 14. Light is emitted from light transmitting device 12 along a path into optical fiber 14 and thence toward light receiving device 13. In most instances, these devices are transceivers capable of both receiving and sending light signals thereby providing two way communication. Specifically, these devices are typically infra-red data association (IrDA) data link devices that work in a free space medium and which utilize a light source for generating light signals. In the ensuing description the light source for a data link device will be described.

Figure 2:
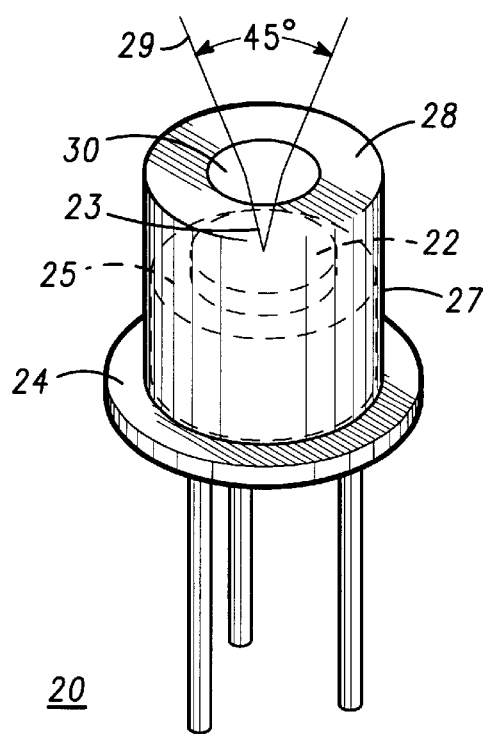
FIG. 2 is an isometric view of a light source used in an IrDA in accordance with the present invention.

Turning now to FIG. 2, a perspective view illustrating a light source generally designated 20 is illustrated. Light source 20 includes a vertical cavity surface emitting laser (VCSEL) 22 which generates the light signal in the form of a laser beam designated 23. The use of a VCSEL greatly reduces power consumption while enhancing the ability to increase transmission speeds. This will be discussed in greater detail presently. VCSEL 22, in this embodiment, is carried by a conventional TO-head 24 having a base 25 and sidewalls 27. Further description of To-head 24 is omitted as it is well known in the art. VCSEL 22 is mounted on base 25 and enclosed by sidewall 27.

VCSELs typically generate a beam of light having a very small divergence angle which is unsuitable as the light signals for data links. A divergence device is used to diverge the emitted light so that it is readily receivable by the downstream element such as a free space medium. The diverger is positioned in the path of the beam, diverging the beam of light as much as 45 degrees. Lesser divergence is readily obtainable.

A lid 28 is positioned on sidewalls 27 enclosing VCSEL 22. VCSEL 22 is oriented to emit a beam of light (laser beam 23) along a path generally vertically upward, through lid 28 which is positioned in the path of the beam of light. Laser beams, as emitted by VCSEL 22, provide sufficient light for signals, but, as discussed previously, are much too narrowly collimated to cover the area necessary. Light source 20 includes a diverger to increase the divergence angle of the beam of light. In this embodiment, the diverger is a lens 30 carried by lid 28. Lens 30 can actually be molded as a portion of lid 28. As illustrated, lens 30 is a negative lens. Specifically, lens 30 is a concave lens. As laser beam 23 passes through lens 30, its divergence angle is increased as to as much as 45 degrees to provide a light beam 29 having the desired divergence angle. While the diverger is illustrated as a concave or negative lens, a holographic-unit diffuser can also be employed as lid 28. A holographic diffuser will adequately diverge the beam of light as required. It should also be noted here that packaging other than a TO-head can be employed for housing VCSEL 22 and carrying a diverger power increasing the divergence angle of the beam of light.

Figure 3:
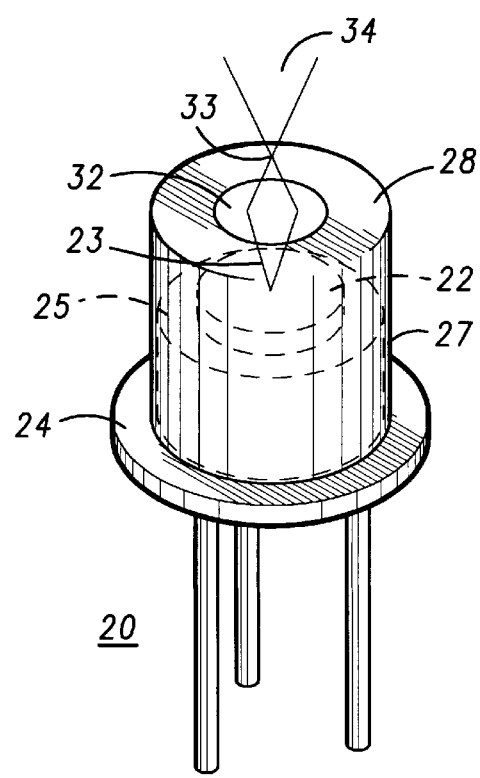
FIG. 3 is an isometric view of light source of FIG. 2 having a positive lens.

Referring now to FIG. 3, light source 20 is illustrated with an alternate diverger. In this specific instance, the diverger is a positive lens 32 positioned extremely close to VCSEL 22, resulting in an over-convergence of the light beam. An over-convergence of the light beam is as effective as a divergence of the beam, resulting in an increase in the divergence angle. As laser beam 23 passes through positive lens 32, it is converged to a point 33, after which the beam over converges with the net result of a beam 34 having an increased divergence angle.

By employing a VCSEL as a light source in a data link device, energy consumption is greatly reduced. This is extremely important for portable applications. As an example, employing a VCSEL in a light source resulting in a 45 degree viewing angle requires approximately 48 mA assuming slope efficiency of 0.4 W/A. This is a great improvement over the 250 mA pulsed at 30 degree viewing angle for a conventional LED. Furthermore, using a VCSEL in a light source can provide data transmission speeds of 10 Mbit/sec and 100 Mbits/sec.

Thus, a new and improved light source for a data link device is provided. Further provided is a new light source for a data link device capable of higher transmission speeds and having low power consumption making it ideal for portable use.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same.

What we claim is:

1. A photonic data link comprising:
   a free space data transmitting device including a vertical cavity surface emitting laser for emitting a beam of light and a spacial diverger including a lens positioned in the path for diverging the emitted beam of light; and
   a data receiving device spaced from the data transmitting device for receiving transmitted light.

2. A data link as claimed in claim 1 wherein the lens includes a negative lens.

3. A data link as claimed in claim 2 wherein the negative lens further includes a concave lens.

4. A photonic data link comprising:
   a free space data transmitting device including a vertical cavity surface emitting laser for emitting a beam of light and a spacial diverger including a holographic-unit diffuser positioned in the path for diverging the emitted beam of light; and
   a data receiving device spaced from the data transmitting device for receiving transmitted light.

5. A data link as claimed in claim 1 wherein the lens is a positive lens positioned in the path proximate the vertical cavity surface emitting laser to over converge the emitted beam of light.

6. A data link as claimed in claim 1 wherein the VCSEL is mounted in a TO-head, the To-head including a lid carrying the diverger.

7. A light source for use in a infra-red data association data link device comprising:
   a vertical cavity surface emitting in free space laser for emitting a beam of light along a path; and
   a spacial diverger including a lens positioned in the path for diverging the emitted beam of light.

8. A light source as claimed in claim 7 wherein the lens is a negative lens.

9. A light source as claimed in claim 8 wherein the negative lens includes a concave lens.

10. A light source for use in a infra-red data association data link device comprising:
    a vertical cavity surface emitting laser for emitting in free space a beam of light along a path; and
    a spacial diverger including a holographic-unit diffuser positioned in the path for diverging the emitted beam of light.

11. A light source as claimed in claim 7 wherein the lens is a positive lens positioned along the path to over converge the emitted beam of light.

12. A light source as claimed in claim 7 wherein the vertical cavity surface emitting laser is mounted in a TO-head, the To-head including a lid carrying the diverger.

13. A light source for use in an infra-red data association data link device comprising:
    a vertical cavity surface emitting in free space laser for emitting a beam of light along a path; and
    a spacial diverger including a lens positioned in the path for diverging the emitted beam of light up to approximately a 45 degree angle of divergence.

14. A light source as claimed in claim 13 wherein the lens includes a negative lens.

15. A light source as claimed in claim 14 wherein the negative lens includes a concave lens.

16. A light source for use in an infra-red data association data link device comprising:
    a vertical cavity surface emitting laser for emitting in free space a beam of light along a path; and
    a spacial diverger including a holographic-unit diffuser positioned in the path for diverging the emitted beam of light up to approximately a 45 degree angle of divergence.

17. A light source as claimed in claim 13 wherein the lens includes a positive lens positioned along the path proximate the vertical cavity surface emitting laser, to over converge the emitted beam of light.

18. A light source as claimed in claim 13 wherein the vertical cavity surface emitting laser is mounted in a TO-head, the To-head including a lid carrying the diverger.

* * * * *